June 3, 1930.  C. A. POOL  1,761,894
MILK BOTTLE RETRIEVER
Filed March 26, 1929  3 Sheets-Sheet 1
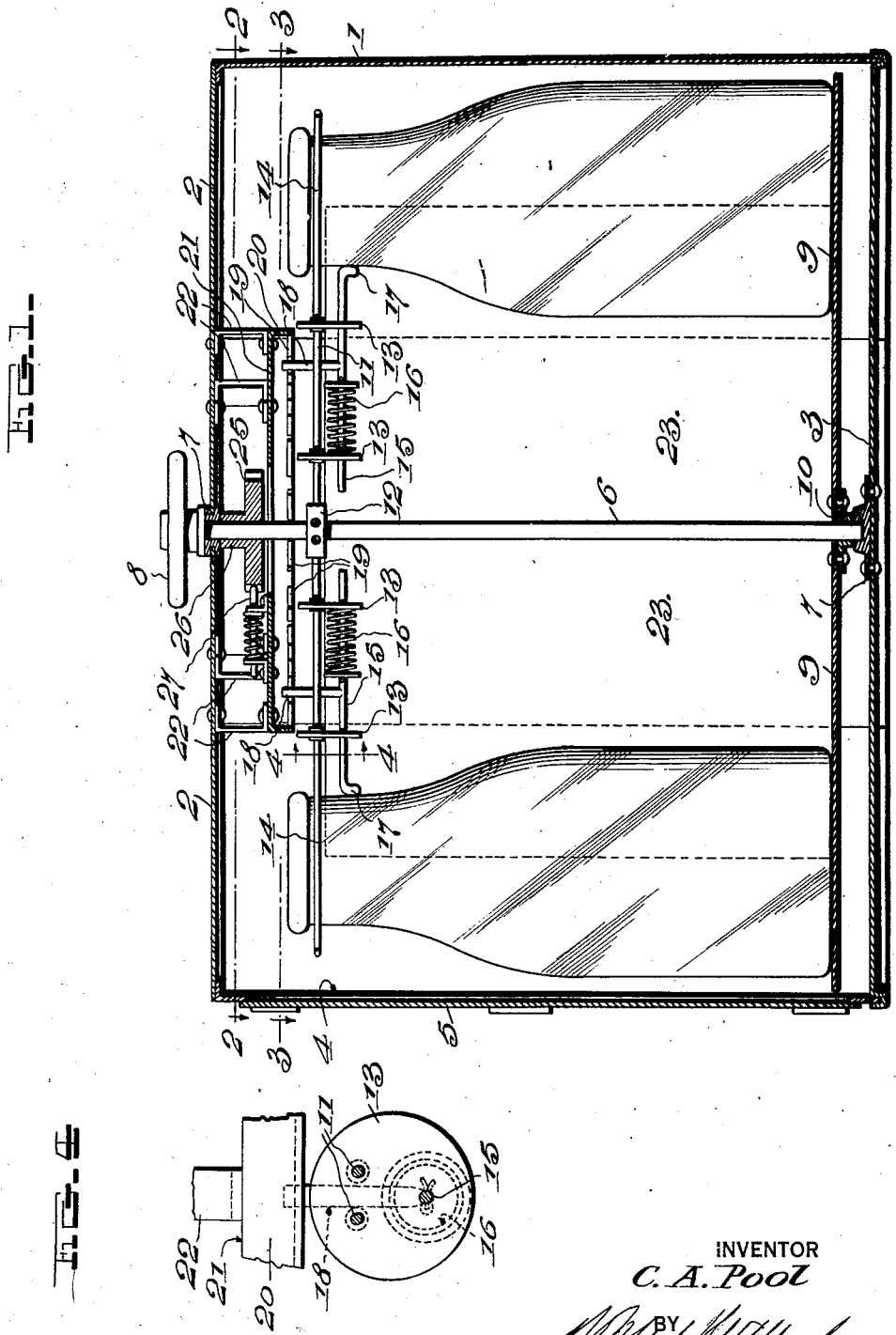
INVENTOR
C. A. Pool
BY
ATTORNEY

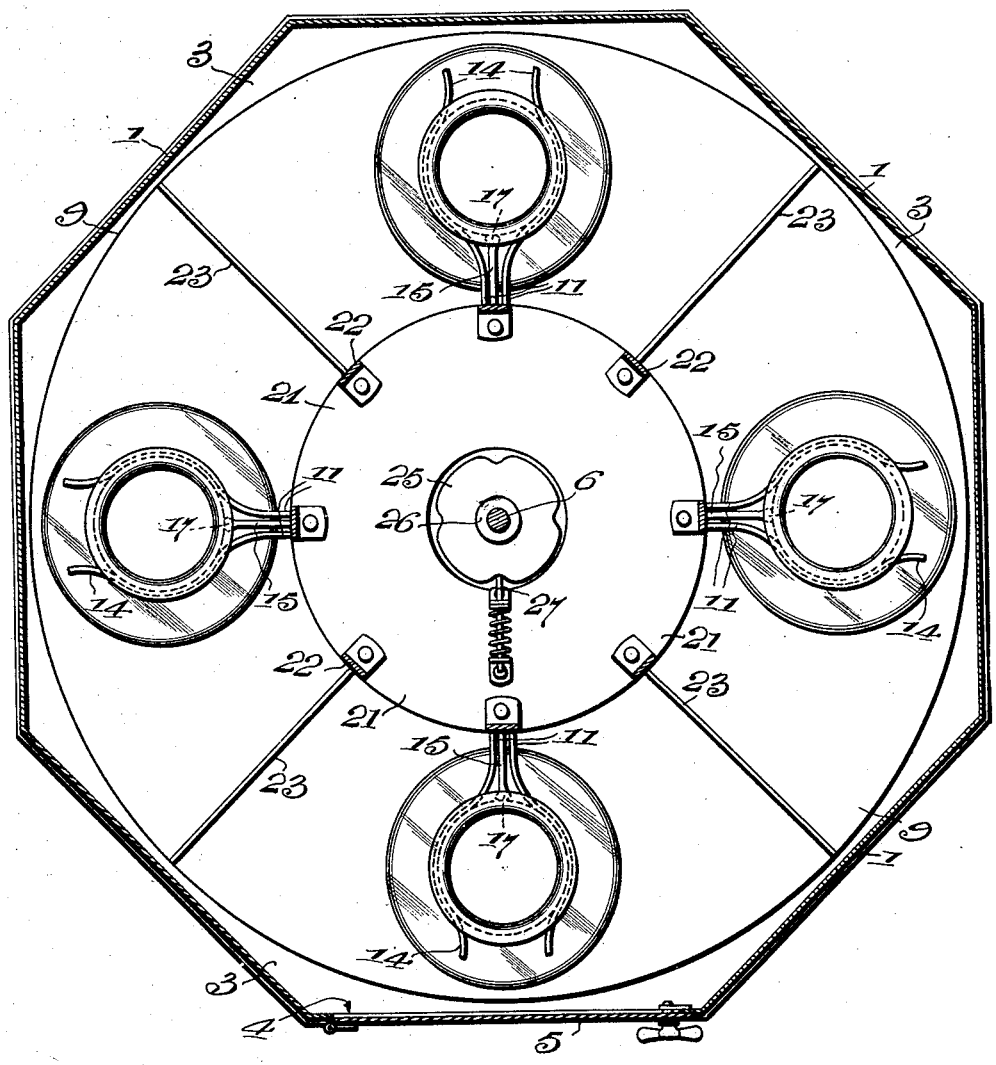

June 3, 1930.  C. A. POOL  1,761,894
MILK BOTTLE RETRIEVER
Filed March 26, 1929  3 Sheets-Sheet 3
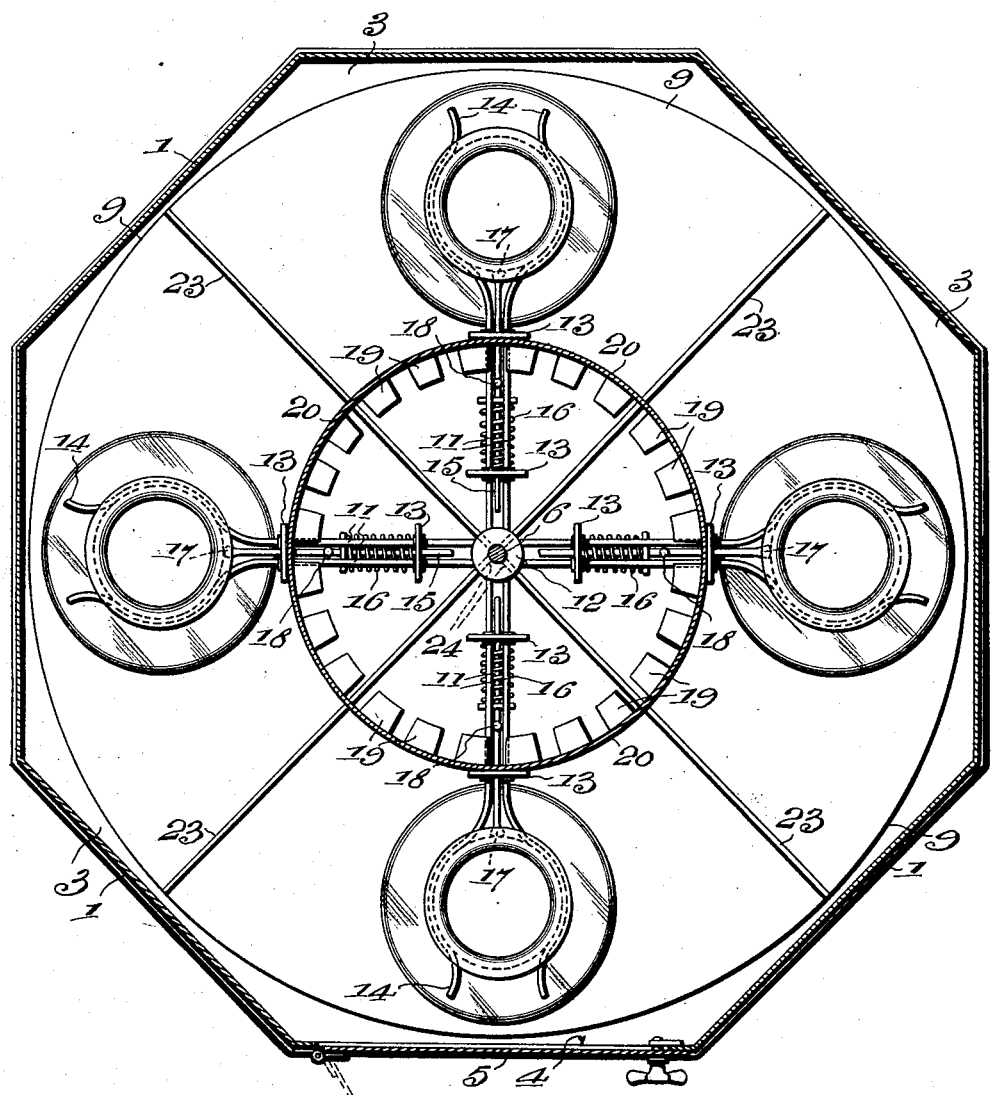
INVENTOR
C. A. Pool
ATTORNEY Patented June 3, 1930

1,761,894

UNITED STATES PATENT OFFICE

CHESTER A. POOL, OF TWIN FALLS, IDAHO

MILK-BOTTLE RETRIEVER

Application filed March 26, 1929. Serial No. 350,008.

The invention primarily has for its object to provide a novel means to receive bottles of milk when delivered by a dairyman, mechanism being included which renders it impossible for the customer to remove the delivered bottle until he has deposited an empty bottle in exchange therefor.

In its more detailed nature the invention resides in the provision of a casing having an opening just large enough to enable removal of a single bottle of milk, and a novel turntable-like mechanism within the casing, having individual arms to receive milk bottles, there being mechanism associated with each arm and automatically active whenever a bottle is removed from the arm to lock the turntable against rotation, rendering it necessary always to insert an empty bottle into an empty arm before the turntable can be rotated to present a full bottle equipped arm for access through the casing opening.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a vertical cross section illustrating the invention in use.

Figure 2 is a horizontal section taken on the line 2—2 on Figure 1.

Figure 3 is a horizontal section taken on the line 3—3 on Figure 1.

Figure 4 is a detail cross section taken on the line 4—4 of Figure 1.

In carrying out the invention I provide a cabinet or casing having sides 1, a top 2, and a bottom 3, one of the sides being provided with an opening 4 just large enough to permit the mounting and withdrawal of a milk bottle. The opening may be closed by a suitable door 5 if desired.

Within the casing a shaft 6 is mounted in top and bottom bearings 7 carried by the casing, for rotation about a vertical axis. The shaft may be extended through the top of the casing if desired and provided with a hand wheel 8, through which rotation may be imparted thereto. Within the housing a turntable or platform 9 is secured upon the shaft, as at 10, to rotate therewith.

A plurality of radial arms 11 is mounted as at 12 upon the shaft and in the disclosure here made each arm comprises a pair of spring wires suitably spaced by a pair of spacer plates 13, the said wires being flared and shaped at their outer or free ends as at 14 to receive a milk bottle neck. In this disclosure I have shown the milk bottle as resting upon the turntable or platform 9, and this is preferred, but it should be understood that the arm ends 14 alone may serve as the entire means of support for the bottle. The spaced plates 13 carried by each arm also serve to slidably support a lock rod 15 which is normally pressed by a coil spring 16 into position for having its outer end 17 project in the way of a bottle carried at the end of the arm.

Each rod 15 also includes an upstanding lock finger extension 18 which cooperates with the spaced lugs 19 carried by the depending flange 20 of the lock plate 21 to secure the shaft against rotation whenever one of the arms is empty, or in other words when not carrying a milk bottle. The lock plate is secured as at 22 upon the housing top or any other suitable support.

Partition wings 23 are secured as at 24 on the shaft and serve to separate each arm from the remaining arms and the said partitions also act to frustrate unauthorized release of the various locking devices and unauthorized removal of full bottles of milk.

If desired a notched disk 25 may be secured as at 26 on the shaft to coact with a spring detent 27 which will enter a disk notch each time one of the arms comes into register with the casing opening so as to assure proper positioning of the shaft and arms and also to prevent coasting of the shaft and turntable.

In operation, assume three of the arms shown in the drawing (this is an optional illustration and any number of arms may be employed) to be filled with empty bottles.

The bottles will have engaged the lock rod ends 17 and released locking engagement between the lock fingers 18 and lock lugs 19. The empty arm will be positioned in register with the casing door.

With the parts in this position and condition the milkman forces a full bottle of milk into the empty arm, releasing the lock finger associated therewith and permitting rotation of the turntable to bring the other arms into register with the door opening. As an empty bottle is withdrawn from each arm the milkman must substitute a full bottle of milk to again release the lock finger and thus permit the rotation necessary to bring the next arm into register, and so on until all of the arms save one are supplied with a full bottle. The single empty arm will be positioned in register with the casing door.

The customer seeking to remove the delivered milk must first release the lock finger associated with the single empty arm by mounting an empty bottle in the end of the said arm, thus enabling rotation of the turntable a sufficient distance to bring one of the full bottle equipped arms into register with the opening. Upon removal of this bottle the parts will again become locked against rotation by release of the spring projected rod end 17 and the engagement of the lock finger and the particular lock plate lugs, and it will be necessary to mount an empty bottle in the arm to again unlock the parts and allow further rotation.

In this manner it is necessary for a customer to return an empty bottle for each full bottle delivered, and by reason of the provision of the cross partitions and the provision of the lock lugs around the whole periphery of the lock plate, and not only at the registering stations, it is impossible to reach in and remove milk bottles from arms not in register or to successfully release the lock mechanism associated with the registering lock arm by means other than the insertion of an empty bottle, to enable improper rotation of the turntable.

From the foregoing description, taken in connection with the accompanying drawing, it is thought that the novel details of construction, the manner of use and the advantages of my invention will be readily apparent to those skilled in the art to which it relates.

What I claim is:

1. A device of the character described comprising a movable bottle carrier, means to lock the carrier against movement, and means operable upon the positioning of a bottle upon the carrier to release the said locking means.

2. A device of the character described comprising a movable bottle carrier, means to lock the carrier against movement, and means operable upon the positioning of a bottle upon the carrier to release the said locking means, and upon removal of a bottle from the carrier to relock the said locking means.

3. In a device of the character described, a rotatable shaft, a plurality of arms carried by the shaft and each having provision to receive a bottle, a casing having an opening through which a bottle may be passed, means to move the shaft to selectively bring the arms into register with the opening, and means releasable upon the mounting of a bottle on an arm to lock the shaft against rotation.

4. In a device of the character described, a housing having a door, a bottle carrier having provision to carry full bottles movable past said door, and means to prevent removal of a full bottle from said carrier without first mounting an empty bottle on the carrier.

5. In a device of the character described, a bottle carrier having provision to carry full bottles, means to prevent removal of a full bottle without first mounting an empty bottle on the carrier, said carrier having a plurality of arms each capable of carrying one bottle, a casing having an opening through which only one bottle may pass at a time, said carrier being movable to cause the arms to selectively register with the opening, and means on each arm active when that arm is not carrying a bottle to lock the carrier against movement.

6. In a device of the character described, a rotatable shaft, a plurality of arms carried by the shaft and each having provision to receive a bottle, a casing having an opening through which a bottle may be passed, means to move the shaft to selectively bring the arms into register with the opening, means releasable upon the mounting of a bottle on an arm to lock the shaft against rotation, and partition plates carried by the shaft and serving to separate each arm from the remaining arms.

7. In a device of the character described, a rotatable shaft, a plurality of arms carried by the shaft and each having provision to receive a bottle, a stationary lock plate having lock notches therein, and a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring.

8. In a device of the character described, a rotatable shaft, a plurality of arms carried by the shaft and each having provisions to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, and a housing having an opening large enough to permit passage of a single bottle, and means to rotate the shaft to bring a selected arm into register with the housing opening.

9. In a device of the character described, a rotatable shaft, a plurality of arms carried by the shaft and each having provision to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, and a housing having an opening large enough to permit passage of a single bottle, means to rotate the shaft to bring a selected arm into register with the housing opening, said lock plate having the lock notches arranged in a complete circle to prevent successful actuation of the release fingers by agencies other than a bottle insertion engagement.

10. In a device of the character described, a rotatable shaft, a plurality of arms carried by the shaft and each having provision to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, a housing having an opening large enough to permit passage of a single bottle, means to rotate the shaft to bring a selected arm into register with the housing opening, and partition plates carried by the shaft and serving to separate each arm from the remaining arms.

11. In a device of the character described, a rotatable shaft, a plurality of arms carried by the shaft and each having provision to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, a housing having an opening large enough to permit passage of a single bottle, means to rotate the shaft to bring a selected arm into register with the housing opening, and partition plates carried by the shaft and serving to separate each arm from the remaining arms, said lock plate having the lock notches arranged in a complete circle to prevent successful actuation of the release fingers by agencies other than a bottle insertion engagement.

12. In a device of the character described a rotatable shaft, a plurality of arms carried by the shaft and each having provision to receive a bottle, a platform carried by the shaft to support the bottles in association with the arms, a casing having an opening through which a bottle may be passed, means to move the shaft to selectively bring the arms into register with the opening, and means releasable upon the mounting of a bottle on an arm to lock the shaft against rotation.

13. In a device of the character described, a rotatable shaft, a plurality of arms carried by the shaft and each having provision to receive a bottle, a platform carried by the shaft to support the bottles in association with the arms, a casing having an opening through which a bottle may be passed, means to move the shaft to selectively bring the arms into register with the opening, means releasable upon the mounting of a bottle on an arm to lock the shaft against rotation, and means tending to hold the shaft at positions in which one of the arms is in register with the opening.

14. In a device of the character described, a rotatable shaft, a plurality of arms carried by the shaft and each having provision to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, a housing having an opening large enough to permit passage of a single bottle, means to rotate the shaft to bring a selected arm into register with the housing opening, and means tending to hold the shaft at positions in which one of the arms is in register with the opening.

15. In a device of the character described, a rotatable shaft, a plurality of arms carried by the shaft and each having provision to receive a bottle, a stationary lock plate having lock notches therein, a lock rod carried by each arm and having a lock finger normally spring-pressed to interlock in one of the plate notches, said rod also having a release finger projecting into position for being displaced by a bottle mounted on the arm to release the lock finger from the engaged plate notch against the tension of the associated spring, a housing having an opening large enough to permit passage of a single bottle, means to rotate the shaft to bring a selected arm into register with the housing opening, partition plates carried by the shaft and serving to separate each arm from the remaining arms, said lock plate having the lock notches arranged in a complete circle to prevent successful actuation of the release fingers by agencies other than a bottle insertion engagement, and means tending to hold the shaft at positions in which one of the arms is in register with the opening.

CHESTER A. POOL.